UNITED STATES PATENT OFFICE.

CARL GOEPNER AND WILHELM WITTER, OF HAMBURG, GERMANY.

METHOD OF MAKING CYANOGEN BROMIDS.

SPECIFICATION forming part of Letters Patent No. 666,135, dated January 15, 1901.

Application filed September 15, 1900. Serial No. 30,138. (No specimens.)

*To all whom it may concern:*

Be it known that we, CARL GOEPNER, of Canalstrasse 46 48, and WILHELM WITTER, of 36 Hohe Bleichen, Hamburg, in the Empire of Germany, have invented a certain new and useful Improved Manufacture of Cyanogen Bromid, of which the following is a specification.

When solutions of a bromid and a bromate in certain proportions are mixed and an equivalent quantity of an alkali cyanid is added to the mixture, together with an acid, such as sulfuric acid, cyanogen bromid is produced.

If instead of the separate bromid and bromate there is used the mixture of salts obtained by dissolving bromin in caustic soda and evaporating the solution, it is only necessary to add alkali cyanid and acid, since the mixture contains the bromid and bromate in the proper molecular proportion.

The formation of the cyanogen bromid is expressed by the following equation:

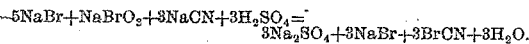
$$5NaBr + NaBrO_3 + 3NaCN + 3H_2SO_4 = 3Na_2SO_4 + 3NaBr + 3BrCN + 3H_2O.$$

If there is added to the mixture an oxidizing agent, the sodium bromid, which remains unchanged, is also decomposed with formation of cyanogen bromid. Suitable oxidants are, for instance, nitric acid, chlorates, bromates, manganates, and the like. Supposing nitric acid be used, the change may be expressed by the following equation:

$$5NaBr + NaBrO_3 + 6NaCN + 6H_2SO_4 + 2HNO_3 = 6Na_2SO_4 + 6BrCN + 2NO + 7H_2O.$$

The most rational oxidant to use is a bromate, in which case the proportion between the bromid and bromate would be that between two molecules of the former to one of the latter, the equation then being $$2NaBr + NaBrO_3 + 3NaCN + 3H_2SO_4 = 3Na_2SO_4 + 3BrCN + 3H_2O.$$

Instead of the bromids and bromates of the alkali metals those of the alkaline earth metals and instead of alkali cyanid hydrocyanic acid may be used.

By mixing the bromid and bromate solution with the cyanid solution and running the mixture into not too dilute hot sulfuric acid the cyanogen bromid may be caused to distil over and may be condensed in another vessel.

The process described above may be carried out both at high and at low temperatures and has the advantage that by it may be obtained pure cyanogen bromid or a dilute solution thereof, such as is used in the cyanid process of gold extraction. In this manner solutions from which the gold has been thrown out and which contain a certain proportion of bromid produced from the cyanogen bromid during the extracting process may be regenerated. In order to raise the contents of such spent solution in cyanogen bromid to the necessary degree, it is only necessary to add the proper proportion of bromate, cyanid, and acid.

Example 1. Four hundred and eighty parts, by weight, of bromin are dissolved in a solution containing two hundred and forty parts of caustic soda, and with this solution of bromid and bromate one hundred and forty-seven parts of sodium cyanid are mixed. Dilute sulfuric acid is added to this solution until rather more than two hundred and ninety-four parts of real sulfuric acid has been introduced. The liquid thus obtained contains cyanogen bromid according to the equations $$6Br + 6NaOH = 5NaBr + NaBrO_3 + 3H_2O$$
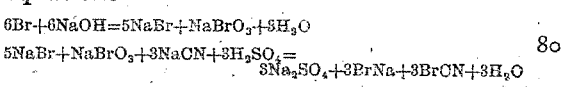
$$5NaBr + NaBrO_3 + 3NaCN + 3H_2SO_4 = 3Na_2SO_4 + 3BrNa + 3BrCN + 3H_2O$$

and is ready for application to gold extraction or other purpose.

Example 2. Two hundred and six parts, by weight, of sodium bromid and one hundred and fifty-one parts of sodium bromate and one hundred and forty-seven parts of sodium cyanid are dissolved in water. To this solution are added two hundred and ninety-four parts of sulfuric acid, whereupon a liquid containing cyanogen bromid is obtained as shown by the following equation:

$$2NaBr + NaBrO_3 + 3NaCN + 3H_2SO_4 = 3BrCN + 3Na_2SO_4 + 3H_2O.$$

Example 3. A solution containing the bromid, bromate, and cyanid of sodium, prepared as described in Example 2, is run slowly into a retort containing hot sulfuric acid of fifty-per-cent. strength and connected with a condenser. Cyanogen bromid begins at once to distil over, and the distillation may be completed by application of heat.

Having thus described the nature of our said invention and the best means we know of carrying the same into practical effect, we claim—

1. The method of making a solution containing cyanogen bromid consisting in first mixing solutions of a bromid, a bromate and a cyanid, and then adding an acid; substantially as described.

2. The method of making a solution containing cyanogen bromid, consisting in first mixing a solution containing two molecular proportions of a bromid with one containing one molecular proportion of a bromate and one containing three molecular proportions of a cyanid, and then adding three molecular proportions of sulfuric acid; substantially as described.

3. The method of making cyanogen bromid consisting in first mixing a solution containing two molecular proportions of a bromid with one containing two molecular proportions of a bromate and one containing three molecular proportions of a cyanid and then running the liquid thus obtained into a retort containing hot sulfuric acid, and finally condensing the cyanogen bromid evolved; substantially as described.

In testimony whereof we have hereunto set our hands in presence of two subscribing witnesses.

CARL GOEPNER.
WILHELM WITTER.

Witnesses:
E. H. L. MUMMENHOFF,
OTTO W. HELLMRICH.